(No Model.)

H. V. KEESON.
CIRCUIT CLOSER.

No. 530,184. Patented Dec. 4, 1894.

Witnesses
B. W. Miller
Guy E. Davis

Inventor
Herbert V. Keeson
By his Attorneys
Baldwin Davidson & Wight

United States Patent Office.

HERBERT VIVIAN KEESON, OF LONDON, ENGLAND.

CIRCUIT-CLOSER.

SPECIFICATION forming part of Letters Patent No. 530,184, dated December 4, 1894.

Application filed September 17, 1894. Serial No. 523,286. (No model.)

*To all whom it may concern:*

Be it known that I, HERBERT VIVIAN KEESON, gentleman, a subject of the Queen of Great Britain, residing at 40 Loudoun Road, St. John's Wood, London, England, have invented a certain new and useful Circuit-Closer, of which the following is a specification.

This invention is especially applicable to electric firing keys for ordnance but may be used for other purposes. Its object is to prevent the accidental closing of the circuit either when the apparatus is dropped or is compressed by a falling body or otherwise. For this purprose the instrument is so constructed that in order to close the circuit two distinct parts have to be moved and in different directions.

Figure 1:
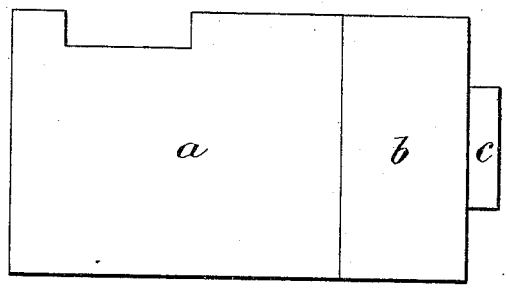
Figure 2:
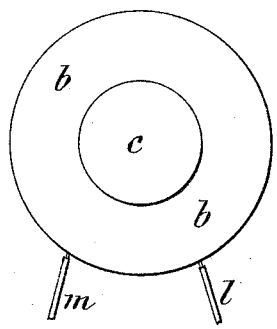
Figure 3:
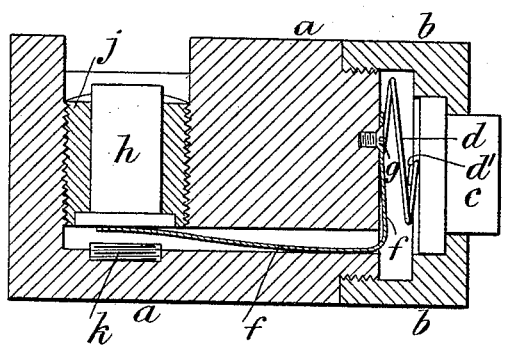
Figure 4:
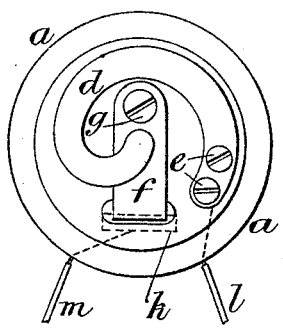

Figure 1 is a side elevation, Fig. 2 an end view, and Fig. 3 a longitudinal section of an apparatus constructed according to this invention. Fig. 4 is an end view with the cap $b$ and push $c$ removed.

$a$ is a cylindrical block of vulcanite. $b$ is a cap screwed to it.

$c$ is a push working in the cap $b$ and bearing upon the spiral spring $d$ which is fixed to the block $a$ by the screws $e$.

$f$ is a spring fixed to the block $a$ by the screw $g$ and bearing upon the push $h$ working in the screw plug $j$.

$k$ is a metal contact plate screwed into the block $a$.

$l$ and $m$ are wires connected to the spring $d$ and plate $k$ respectively.

In order to complete the circuit through the wires $l$ and $m$ it is necessary not only to press in the push $c$ until the projection $d'$ on the spring $d$ comes into contact with the spring $f$ but also to press the push $h$ to bring the spring $f$ into contact with the plate $k$. It will thus be seen that the circuit can only be accidentally closed by two simultaneous blows in different directions which is very unlikely.

It is not essential to have two breaks in the circuit as the pushes might be made to meet each other.

What I claim is—

1. The combination of a block or body, an electric circuit through conductors in it, two breaks in the circuit and two pushes carried by the block or body and acting at right angles or approximately at right angles to each other, each push closing one of the breaks.

2. The combination of a block or body, an electric circuit through conductors in it, a break in the circuit and two pushes carried by the block or body and acting at right angles or approximately at right angles to each other and closing the said circuit when both are operated simultaneously.

3. The combination of a block or body, a contact making push at its end, a spring connected to one of the circuit wires and fixed in the block or body so as to bear against the inner end of the push, a bent spring also fixed in the block or body in such a position that the first mentioned spring when compressed comes into contact with it, a second push at the side of the block or body with its inner end bearing against the bent spring and a contact connected with the other circuit wire and situated beneath the end of the bent spring.

HERBERT VIVIAN KEESON.

Witnesses:
ROBERT B. RANSFORD,
T. F. BARNES.